United States Patent
Adams

(10) Patent No.: US 6,527,487 B2
(45) Date of Patent: Mar. 4, 2003

(54) CARGO CONTROL SYSTEM

(75) Inventor: James H. Adams, Tallmadge, OH (US)

(73) Assignee: East Manufacturing, Randolph, OH (US)

( * ) Notice: Subject to any disclaimer, the term of this patent is extended or adjusted under 35 U.S.C. 154(b) by 0 days.

(21) Appl. No.: 09/815,561

(22) Filed: Mar. 23, 2001

(65) Prior Publication Data

US 2001/0031186 A1 Oct. 18, 2001

Related U.S. Application Data

(60) Provisional application No. 60/191,808, filed on Mar. 24, 2000.

(51) Int. Cl.$^7$ .................................................. B60P 7/08
(52) U.S. Cl. ..................... 410/104; 410/106; 410/110; 410/116
(58) Field of Search ........................... 410/8, 101, 102, 410/104, 105, 106, 108, 110, 116; 296/182; 24/265 CD, 115 K; 248/499

(56) References Cited

U.S. PATENT DOCUMENTS

| 3,018,079 | A | * | 1/1962 | Stough et al. | 410/116 |
|---|---|---|---|---|---|
| 3,070,042 | A | * | 12/1962 | Jensen | 410/116 |
| 3,178,790 | A | * | 4/1965 | Cech | 410/116 |
| 3,294,354 | A | * | 12/1966 | Batey | 410/104 |
| 3,353,780 | A | * | 11/1967 | Young | 410/104 |
| 3,685,778 | A | * | 8/1972 | Berns | 410/116 |
| 3,917,338 | A | * | 11/1975 | Becker | 410/116 |
| 4,226,465 | A | * | 10/1980 | McCullough | 410/104 X |
| 4,248,558 | A | * | 2/1981 | Lechner | 410/104 |
| 4,293,255 | A | * | 10/1981 | Hrasche | 410/104 |
| 4,484,847 | A | * | 11/1984 | Holmes | 410/104 |
| 4,818,162 | A | * | 4/1989 | Zukowski et al. | 410/116 |
| 4,951,365 | A | | 8/1990 | Loyd | |
| 5,516,246 | A | * | 5/1996 | Helton | 410/101 |
| 5,533,848 | A | * | 7/1996 | Davis | 410/105 |
| 5,674,033 | A | * | 10/1997 | Ruegg | 410/104 |
| 5,853,164 | A | | 12/1998 | Hunt | |
| 5,860,777 | A | * | 1/1999 | Walsh et al. | 410/100 |
| 6,250,861 | B1 | * | 6/2001 | Whitehead | 410/100 |

OTHER PUBLICATIONS

Brookfield Aluminum Flatbed Trailers, Brookfield, Missouri, 4 pages, no date.
Kinedyne, 2000 Catalog, Cargo Control Systems, 52 pages.

* cited by examiner

Primary Examiner—Stephen T. Gordon
(74) Attorney, Agent, or Firm—Scott M. Oldham; Hahn Loeser & Parks, LLP

(57) ABSTRACT

The present invention relates to an adjustable, locking cargo control system for a vehicle such as a flat bed trailer, van type trailer, train, airplane or the like. The tie down system comprises at least one groove within the floor of the truck trailer. Each groove has a flange extending inward on either side of the groove. One of the flanges has a plurality of notches formed in it. The system includes at least one tie down member comprising an anchor hook insertable into the groove wherein the hook registers against an anchor flange opposite the flange having the plurality of notches. Each tie down member further comprises at least one boss extending therefrom which is positioned and sized to engage at least one of the notches in the notched flange in a manner preventing the tie down member from sliding along the groove. A tie down chain or cable is attached to the tie down member in a manner to secure a load to the floor of the or other portion of the vehicle.

12 Claims, 4 Drawing Sheets

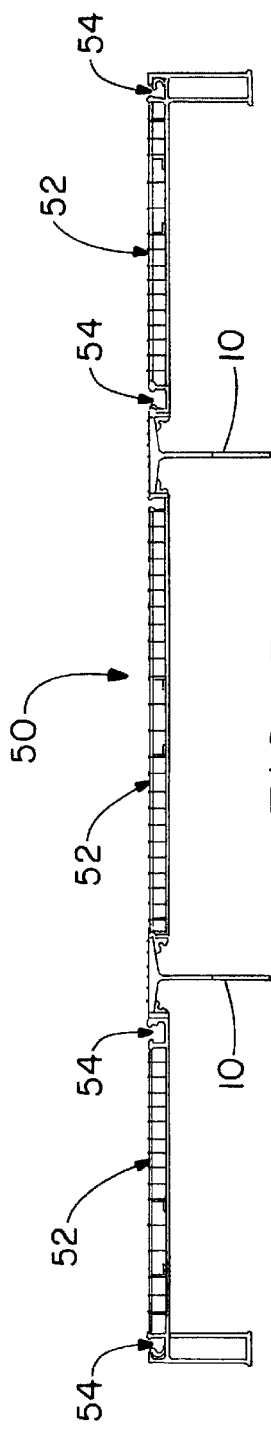
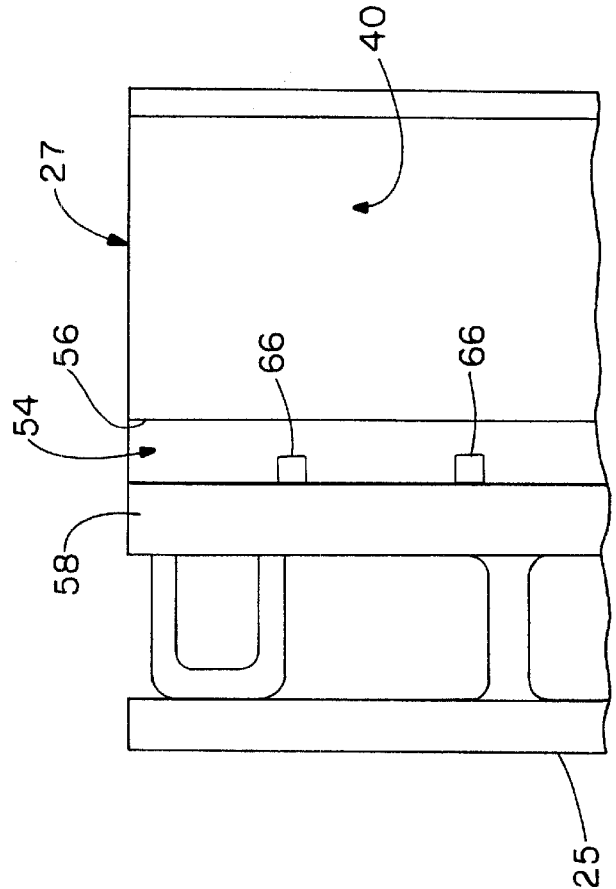
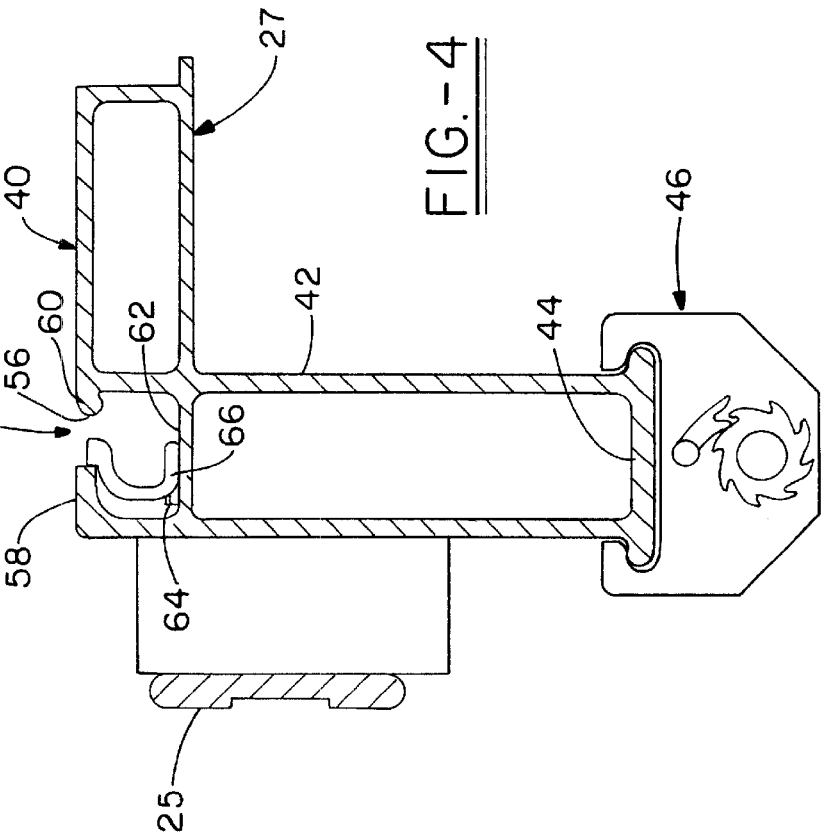

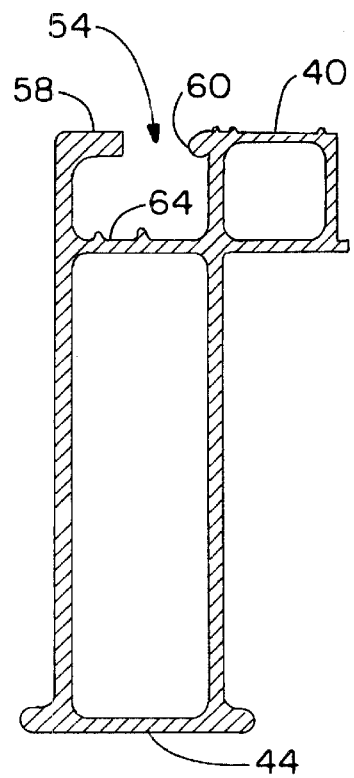
FIG.-6
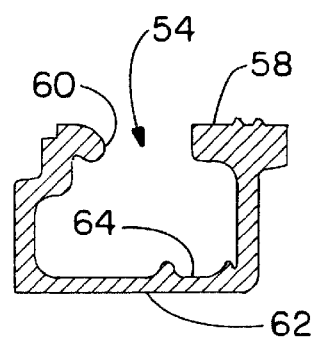
FIG.-7
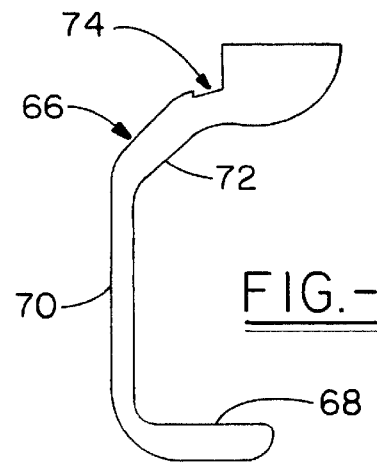
FIG.-8
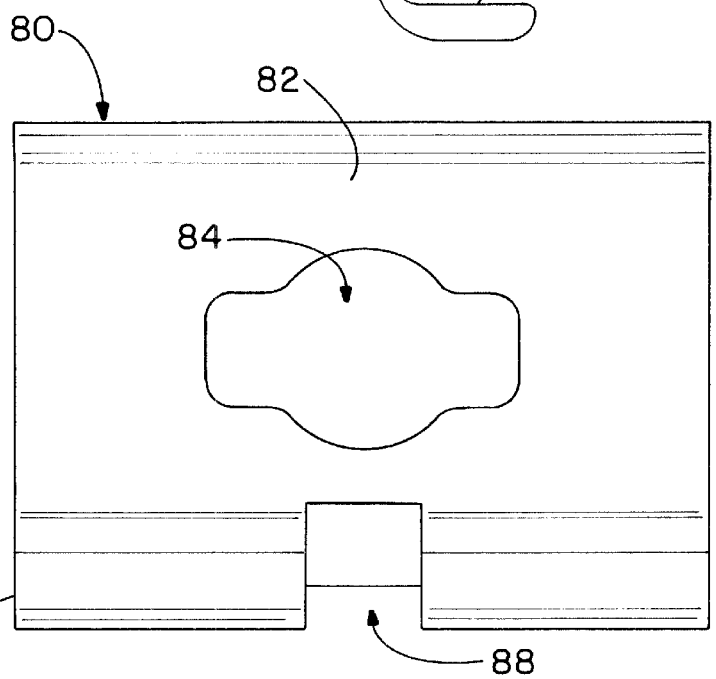
FIG.-9
FIG.-10

CARGO CONTROL SYSTEM

This application claims the benefit of U.S. Provisional Application No. 60/191,808 filed on Mar. 24, 2000.

FIELD OF THE INVENTION

The present invention relates generally to an improved cargo control for facilitating securing of cargo for transportation. More particularly, the invention relates to a tie down system and coupling system to provide an adjustable, locking tie down system.

BACKGROUND OF THE INVENTION

Cargo of various types is transported by a variety of means, including trailers, such as flat bed trailers, which are designed to transport various loads positioned on the trailer bed along its length, or at discrete locations thereon. Other vehicles, such as airplanes or trains, are also used to transport cargo. In many cases, the loads carried by such trailers or other vehicles may be bulky and irregular in shape and/or weight distribution, adversely effecting stability of the load on the trailer, In order to safely transport cargo in such environments, the cargo must be secured against any movement or shifting, and cargo control systems have been developed for this purpose. Such cargo control systems have included retaining straps fixed on one side of a trailer bed and having retaining hooks on a free end which are secured to the other side of the trailer bed over a portion of a load positioned on the trailer bed. The retaining straps may include a ratchet type assembly positioned along its length for tightening down of the strap onto a load. The strap may also be anchored at its one end via a winch assembly for tightening of the strap. Over center buckles are also commonly employed with tensioning straps for cargo tie-down systems to secure cargo on a trailer bed or floor. In the past, the tie down straps may have been situated at discrete intervals along the length of the trailer bed, but were fixed in position, and thus presented problems with properly securing certain loads, depending upon the shape and size of the cargo. More recently, the cargo retaining straps are adjustably positioned by means of movable winches mounted upon elongated tracks fixed to a vehicle bed, floor or vehicle wall. The winches are movable, allowing the tension forces within the cargo-retaining strap to be substantially perpendicular to the axis of the winch track. Different vehicle mounted tracks for use with load bearing winches have been developed, and include a double L track design as well as a C track design as examples.

In addition to these types of cargo control systems, some types of cargo or loads are not properly securable using just tie downs straps or the like, due to their weight, shape or other factors. In such situations, it would be worthwhile to provide a cargo control system that allowed more flexibility to properly secure certain types of goods or cargo, particularly with respect to a trailer, such as a flat bed trailer. For example, it is difficult to properly secure a smaller, very heavy object such as a coil of flat-rolled steel and the like. The typical tie down belts fastened to each side of the trailer side rail span the entire width of the trailer. These belts are not convenient, nor effective for securing a coil of flat rolled steel because the length of the coil is short. The belts are typically permanently affixed to the trailer and positioned at predetermined intervals such that only one or possibly two of the belts could be used to attempt to secure the steel coil load. Additionally, the weight of a steel coil load may be beyond the capacity of one or two belts to secure the load.

To overcome these types of problems, some trailer manufacturers have incorporated a channel or groove into the floor of the trailer. The channel is generally formed with a flange on either side of the groove opening and typically runs the length of the trailer. The channel is used in conjunction with a tie down anchor. The tie down anchor includes a large end piece, which fits within the channel but is too large to fit past, and thus is retained by, the channel flanges. The tie down anchor body extends up through the channel flanges and provides an anchor for a tie down cable, chain, or the like. The large end configuration requires that the tie down anchor is inserted into the channel opening at the end of the channel. This often requires that a section of the trailer end be temporarily removed to gain access to the end of the channel. The tie down can be slid along the channel until it is in the proper location to secure a load. The end of the tie down protruding from the groove typically has a hole or slot to engage a steel cable or chain used to secure the load in conjunction with other like tie downs. The trailers can have multiple grooves, which can accommodate a plurality of tie downs to secure the load.

Unfortunately, the current groove/tie down system still has problems. The tie downs are designed to slide within the channel, which can lead to hazardous results. The tie down can slide from its initial position due to vibration or directional tension or forces exerted by the securing cable or chain. This can result in the loss of tension in the cable or chain, which can in turn allow the tie down to slide more, and eventually result in the loss of the load. This requires that the tie down be secured by using blocks, bars, boards or other means to prevent the tie downs from sliding in the channel.

Based upon the deficiencies of the prior attempts at improving cargo control systems, it would be advantageous to provide a cargo control system integrated into a cargo carrying floor assembly, such as in a floor of a flat bed trailer, van type trailer, train or airplane as examples. The cargo control system should be adjustable and lockable and easily accessed and used for properly securing cargo.

SUMMARY OF THE INVENTION

The present invention overcomes these deficiencies noted in the prior art by providing a novel tie down system for use with a vehicle such as a truck trailer, train or airplane, wherein the tie down system is incorporated into the floor or wall of the vehicle. The tie down system comprises at least one groove within the floor of the vehicle. Each groove has a flange extending inward on either side of the groove. One of the flanges has a plurality of notches formed in it. The system includes at least one tie down coupling member comprising an anchor hook insertable into the groove wherein the hook registers against an anchor flange opposite the flange having the plurality of notches. Each tie down member further comprises at least one boss extending therefrom which is positioned and sized to engage at least one of the notches in the notched flange in a manner preventing the tie down member from sliding along the groove. A tie down chain or cable is attached to the tie down member in a manner to secure a load to the floor of the vehicle. The tie down system allows for selective placement of tie downs with respect to a load to properly secure the load. The system also positively prevents withdrawal of the anchor hook from the channel if a tie down is coupled thereto.

It is therefore an object of the system to provide a locking cargo control system, which facilitates properly securing some types of loads. This and other objects and advantages of the invention will become apparent upon a reading of the following description in conjunction with drawings.

BRIEF DESCRIPTION OF THE DRAWINGS

FIG. 3 is a sectional view showing a floor assembly of a flat bed trailer incorporating the cargo control system of the invention.

FIG. 4 is a sectional view of an end portion of the trailer floor, rub rail and associated winch track and sliding webbing winch used therewith.

FIG. 5 is a top view of a portion of the flatbed trailer as shown in FIG. 4.

FIG. 6 is a sectional view of an extruded floor end portion of the trailer floor.

FIG. 7 is a sectional view of an extruded floor channel for incorporation into the floor assembly of a trailer.

FIG. 8 is a side view of a notch assembly in accordance with the embodiment shown.

FIG. 9 is a partial sectional view of an anchor hook assembly according to an embodiment of the invention.

FIG. 10 is a front view of the anchor hook assembly as shown in FIG. 9.

DETAILED DESCRIPTION OF THE INVENTION

Figure 1:
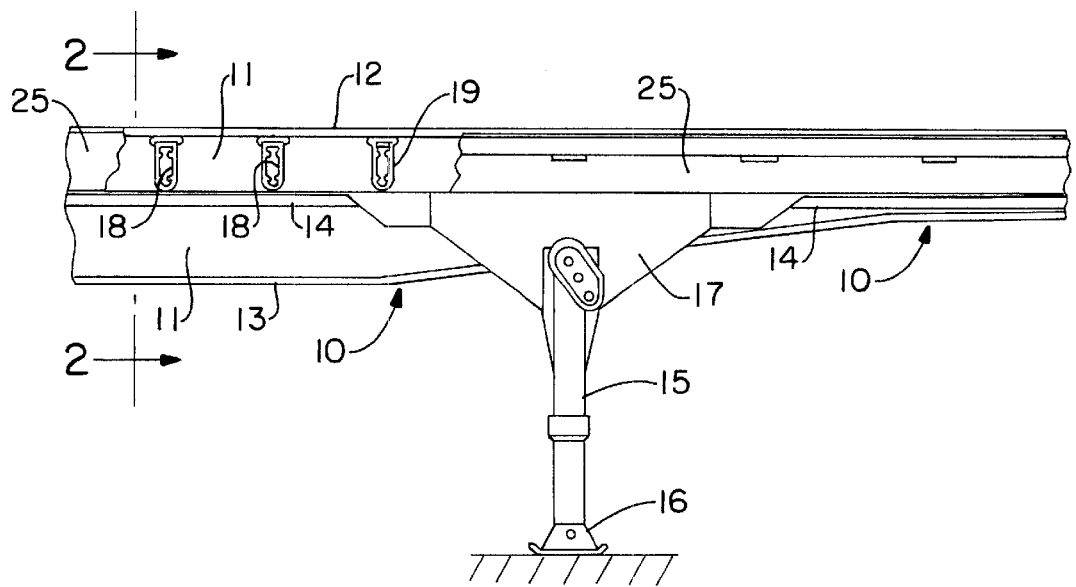
FIG. 1 is a partial side elevational view of a typical flatbed trailer, representing the type of vehicle with which the present invention may be utilized.

By referring to the drawings and FIG. 1 in particular, it will be seen that a known flat bed trailer structure is disclosed which is preferably formed of aluminum extruded and fabricated sections. The portion of the flat bed trailer seen in FIG. 1 comprises a portion inwardly of the front end thereof. The trailer structure is formed of a pair of longitudinally disposed I-beams 10 comprising web portions 11 with upper and lower horizontally disposed flanges or chords 12 and 13 respectively. The I-beams 10 are each formed of a pair of T-shaped extrusions welded to one another longitudinally on a weld line 14. The forward portion of the flat bed trailer has the I-beams 10 of reduced height by forming one of the web portions 11 in a tapered shape below the weld line 14. A retractable double leg support 15 having pivoted ground engaging shoes 16 is attached to the forward portion of the flat bed trailer by semi-triangular mounting brackets 17 which are secured to several of a plurality of transversely positioned tubular frame members 18 which are located in longitudinally spaced transversely registering apertures 19 in the upper portions of the webs 11 of the longitudinally extending I-beams 10 as illustrated in FIGS. 1 and 2 of the drawings.

By referring to FIG. 1 of the drawings, it will be seen that three of the tubular frame members 18 are shown double welded in three of the apertures 19, a portion of an outside rail 25 being broken away. Each of the tubular frame members 18 are double welded in position in each of the pairs of transversely registering apertures 19 formed in the upper portions of the webs 11 of the I-beams 10. Each of the opposite spaced vertical side walls of the tubular frame member 18 are welded by fillet welds to the portions of the I-beam web 11 defining the vertical walls of the aperture 19 therein so as to result in double welds joining the side walls of the tubular frame members 18 to the I-beams 10. The lower portion of the aperture 19 is cross sectionally curved in a half circular shape matching that of the bottom portion of the tubular frame members 18 which fit snugly therein.

Figure 2:
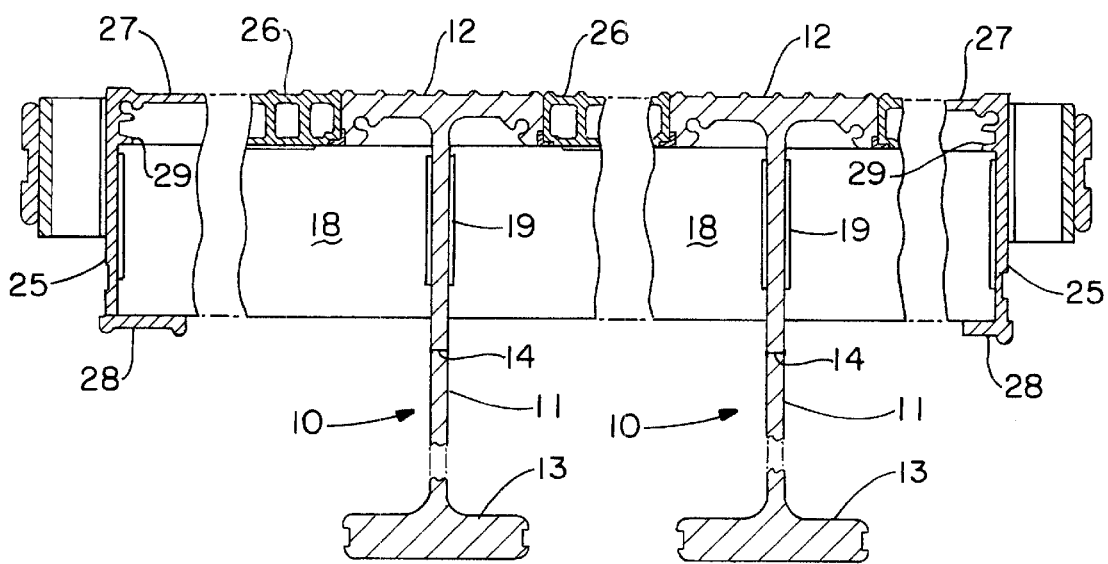
FIG. 2 is a partial cross-section of the bed portion associated with the trailer as shown in FIG. 1, being representative of a type of flatbed construction known in the art.

By referring now to FIG. 2 of the drawings, a transverse section, on an enlarged scale, through the flat bed trailer may be seen and by referring thereto one of the transversely positioned tubular frame members 18 will be seen double welded in the apertures 19 in the webs 11 of the I-beams 10. It will also be see that the upper transversely disposed portions 12 of the I-beams 10 form a portion of the floor of the flat bed trailer. Several longitudinal extending compartmented hollow flooring sections 26 are positioned longitudinally of the flat bed trailer in abutting parallel relation with the upper transversely disposed portions 12 of the I-beams 10. The flooring sections 26 are welded to each of the transversely positioned tubular frame members 18 which support the same.

The outside rail 25 has vertically spaced inwardly extending right angular sections 27 and 28 on its upper and lower edges and an in-turned flange 29 spaced with respect to the upper flange 27. The ends of each of the transversely positioned tubular frame members 18 abut the inner surface of the outside rails 25 and are welded thereto and the in-turned longitudinally extending rib 29 rests on the upper straight top portion of each of the transversely positioned tubular frame members 18 and thereby spaces the in-turned flange 27 thereabove on the same level as the upper surfaces of the flooring sections 26 and the upper surfaces of the transversely disposed portions 12 of the I-beams 10.

The known flat bed trailer structure disclosed herein is formed of aluminum extrusions welded to one another in the finished flat bed trailer assembly and the spaced longitudinally extending I-beams 10 are fabricated from two such aluminum extrusions, each of which is T-shaped and which extrusions are arranged with one upright and one inverted and joined together by welding them continuously to one another on the weld line 14 hereinbefore referred to. The assembly of the I-beams from the two T-shaped aluminum extrusion enables the plurality of apertures 19 in each of the web portions 11 of the I-beams 10 to be stamped therein with a controlled size and configuration which insures the accurate and desirable positioning of the transversely positioned tubular frame members 18 where they may be easily and efficiently double welded and serve not only to cross brace the I-beams 10, but provide continuous side to side supporting structure for the flooring of the flat bed trailer structure.

Referring to FIG. 3, a sectional view of a new floor, wall or like assembly 50 for use in construction a trailer or for use in another vehicle floor or wall. The floor system 50 is shown to comprise a plurality of extruded floor sections 52 as previously described, but also comprises at least one retention channel 54 therewith. In the embodiment shown, the retention channels 54 are positioned directly adjacent the outside of I-beams 10, as well as at the outside portion of the floor assembly 50. The retention channels 54 may be extruded, and as such may extend along the entire length of the trailer bed or be positioned at discrete locations if desired.

As seen in FIGS. 4 and 5, a retention channel may be provided in the outside portion of the floor assembly outboard of the I-beams, comprising the rub rails 25 secured to an outside flooring section 27. The flooring section 27 includes an upper surface 40 comprising a portion of the surface used to support cargo on the trailer. There may also be provided a downwardly extending wall portion 42 having a flange 44 at its outer end. The flange 44 provides a mounting rail for a sliding winch assembly 46. In a portion of the floor assembly, the retention channel is provided, which may be suitably formed along with the floor assembly during extrusion as an example. The channel 54 is formed by an opening 56 in the upper surface 40. The channel 54 thus includes an upper wall section 58 on one side of the opening 56 and an upper flange 60 on the opposing side of the opening 56. Two side walls and a bottom wall 62 form the remainder of the channel 54. Within the channel 54 on the bottom surface 62, a seat 64 for insertable notches 66 is provided. As shown in FIG. 5, the notches 66 may be positioned at any desired location along the channel 54, and preferably may be positioned at regular intervals along the channel 54.

Turning now to FIGS. 6–7, the outside retention channel shown in FIG. 4 is shown in more detail, with the seat 64 seen more distinctly. Similarly, other retention channels may be positioned at other locations within the floor assembly, and in the embodiment of FIG. 3, inside channels are provided adjacent the I-beams 10. The inside channels are shown in FIG. 7, and may comprise a similar structure to the outside channels 54 shown in FIG. 6. The flange 60 in the channels 54 is shown to be formed with a slight downward angle, and is radiused to facilitate coupling with an anchor hook to be described hereafter. The flange ensures proper retention of the anchor hook in the retention channel 54 and prevents binding of the hook in the channel 54.

Turning to FIG. 8, the insertable notches 66 are shown in more detail. The notches 66 are formed to be seated within the channel 54 as shown in FIG. 4, and may be secured in a desired position by welding, adhesive, mechanical fastening or other suitable means. The notches 66 in conjunction with the channels 54 and anchor hooks to be described, provide a lockable cargo control system as desired. As can be seen in FIG. 8, the notches 66 may comprise a bottom wall 68 which engages seat 64 formed in the channels 54. A side wall 70 is contoured to follow the inside side wall of a channel 54, and includes a tapered section 72 terminating in a mounting slot 74. The mounting slot 74 engages the top edge of the top wall 58 associated with the channel 54 as described in FIG. 4. There is further included an outwardly extending notch head which extends into the opening 56 a predetermined distance, as seen in FIGS. 4 and 5.

Once the notches 66 are positioned and secured in place, the retention channel 54 is ready for use with an anchor hook assembly as shown in FIGS. 9 and 10. Although the invention is described as providing snap in insertable notches 66, the notches are provided as separable elements to facilitate manufacture by extrusion processes. In an extrusion process, the formation of integral notches 66 is not possible, but it should be recognized that the notches 66 could be formed integrally with the channels 54 if desired. The anchor hook assembly 80 may comprise an upper section 82 having an aperture 84 formed therein. The aperture 84 can be used to secure a cargo retention member (not shown) such as a chain, strap or the like. A lower hook section 86 is provided, which is configured to be inserted into a retention channel 54 as described. Within the hook section 86, a slot 88 is provided, which mates with a notch 66 to lock the anchor hook in position at the location of a notch 66.

Figure 11:
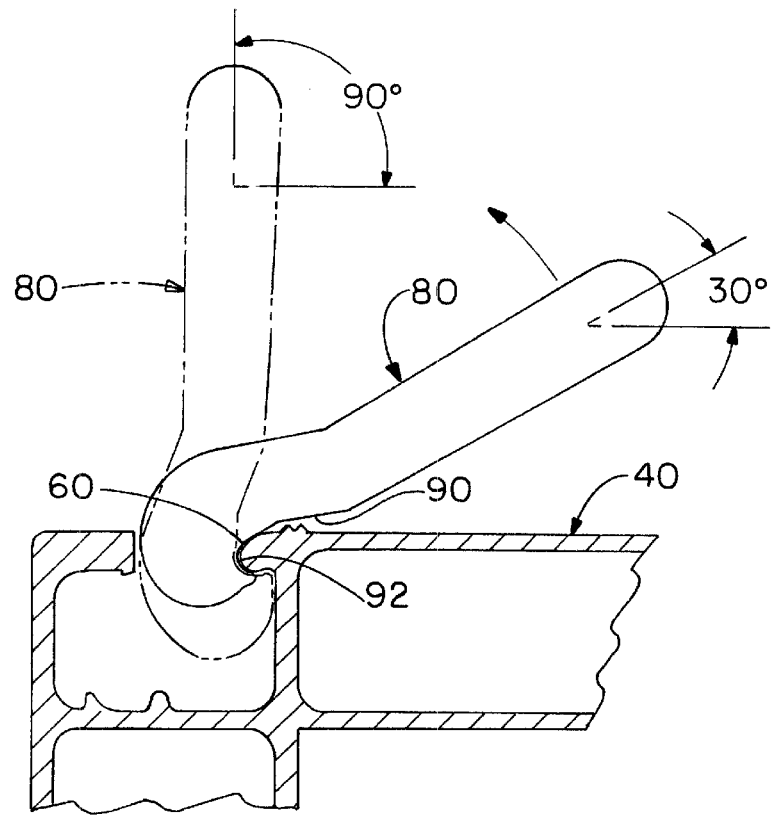
FIGS. 11 and 12 show coupling of the anchor hook member with the retention channels formed in the floor or wall of a vehicle.
Figure 12:
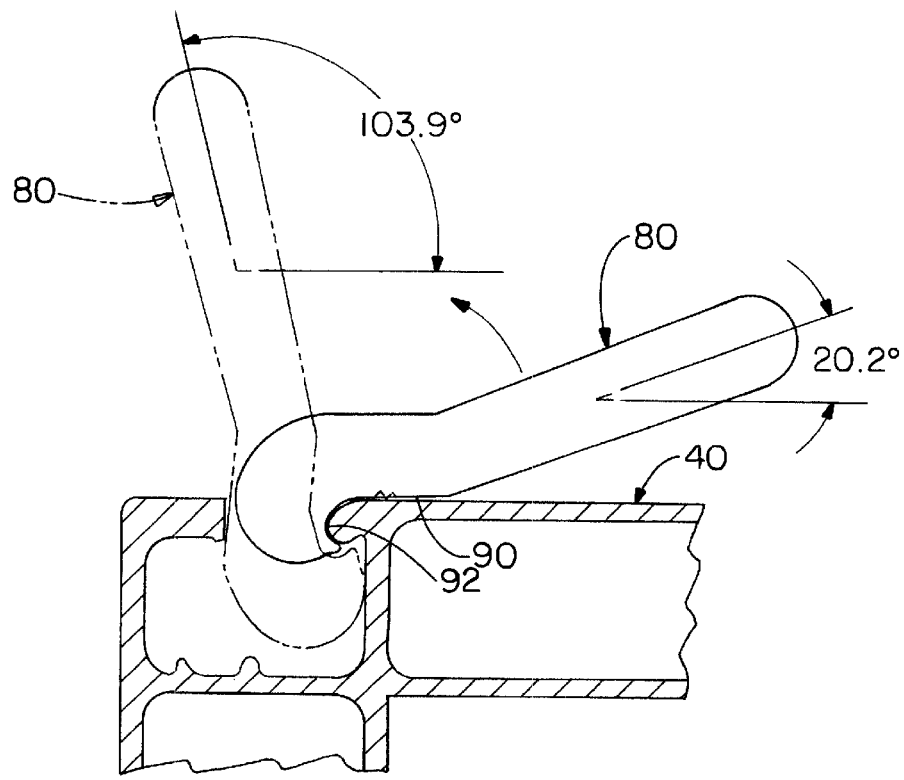

The anchor hook assembly 80 further is configured to positively be retained in association with a retention channel 54 when a retention member (such as a chain, strap or the like) is attached thereto through aperture 84. The hook section 86 of the anchor member 80 includes a surface 90 which is angled outwardly from the hook 92, and forms a land surface. The upper section 82 then is angled again with respect to the surface 90. As seen in FIGS. 11 and 12, when the member 80 is inserted into a channel 54, the section 86 is inserted at an angle to allow the hook 92 to slide into the channel 54. Upon upward rotation of the anchor 80, the hook portion 92 engages the flange to be retained in association with the channel 54 as seen in FIG. 11. Once retained with the channel, a retention member can then be secured to the anchor 80 through the aperture 84. When secured through the aperture 84, it should be recognized that a portion of a retention member, such as a chain or the like, will extend outwardly of the section 82. Once a retention member is secured to the anchor 80 in this fashion, the retention member itself will interfere with an adjacent portion of the floor assembly such that the anchor cannot be laid down with the land surface 90 against the floor 40 as seen in FIG. 12. In this manner, the anchor 80 cannot be disengaged from the channel 54 unless the retention member is removed from engagement with the aperture 84 to allow the anchor 80 to be angled to the position with land 90 resting on floor 40, at which time the hook portion 92 can be released from engagement with flange 60 and from the channel 54. This provides an extremely secure and safe system that cannot loosen or shift, and will better secure a load.

Although several specific embodiments of the invention have been described herein, various modifications or variations will be apparent to one skilled in the art without departing from the principles and teachings herein. Accordingly, the invention is not to be limited to the specific embodiments illustrated, but is only intended to be limited by the scope of the appended claims.

What is claimed is:

1. A cargo control system comprising:
   at least one retention channel formed in a vehicle, said channel having at least one notch formed therein extending from a side of said channel;
   an anchor member selectively insertable into said channel, said anchor member having an engaging portion which is selectively engaged with said channel and an outer portion extending upwardly from said channel to secure a retention member thereto, wherein said anchor member has a slot formed therein to engage a notch in said channel to substantially prevent movement of said anchor member within said channel.

2. The cargo control system of claim 1, wherein said anchor member has an aperture therein to which a retention member may be selectively secured.

3. The cargo control system of claim 1, wherein said anchor member has a hook portion which is insertable into said at least one retention channel, wherein said hook portion registers against an anchor flange to selectively be retained in said channel.

4. The cargo control system of claim 3, wherein said anchor member comprises an angled land surface adjacent said hook portion which contacts a surface adjacent said channel to release the hook portion from engagement with said channel.

5. The cargo control system of claim 3, wherein said anchor flange is reinforced such that said anchor flange is strong enough to secure said anchor member in said channel.

6. The cargo control system of claim 1, wherein said anchor member can be inserted into said at least one channel at any location along said at least one channel.

7. The cargo control system of claim 1, wherein said vehicle is a flat bed trailer, and said at least one channel is formed in a floor assembly of the flat bed trailer.

8. The cargo control system of claim 7, wherein said at least one channel is formed by extrusion.

9. The cargo control system of claim 1, wherein said notch is formed as a separate member and is selectively secured in said channel at a desired location.

10. The cargo control system of claim 9, wherein a plurality of notches are secured within said channel.

11. The cargo control system of claim 9, wherein said channel comprises a notch seat to receive and position said notch in said channel.

12. A cargo control system comprising:

at least one retention channel formed in a vehicle, said channel having at least one notch formed therein extending from a side of said channel;

an anchor member selectively insertable into said channel, said anchor member having an engaging portion which is selectively engaged with said channel and an outer portion extending upwardly from said channel to secure a retention member thereto, wherein said anchor member has a slot formed therein to engage a notch in said channel to substantially prevent movement of said anchor member within said channel, wherein said anchor member can be inserted into said at least one channel at any location along said at least one channel.

* * * * *